No. 703,294. Patented June 24, 1902.
U. NEHRING.
CAMERA AND FOCUSING FINDER THEREFOR.
(Application filed July 23, 1901.)
(No Model.)

WITNESSES:
Edward Thorpe.
Walton Harrison.

INVENTOR.
Ulrich Nehring
BY
ATTORNEYS

UNITED STATES PATENT OFFICE.

ULRICH NEHRING, OF NEW YORK, N. Y.

CAMERA AND FOCUSING-FINDER THEREFOR.

SPECIFICATION forming part of Letters Patent No. 703,294, dated June 24, 1902.

Application filed July 23, 1901. Serial No. 69,369. (No model.)

*To all whom it may concern:*

Be it known that I, ULRICH NEHRING, a citizen of the United States, and a resident of the city of New York, borough of Manhattan, in the county and State of New York, have invented a new and Improved Camera and Focusing-Finder Therefor, of which the following is a full, clear, and exact description.

The invention relates to photography, and more particularly to the production of a combined camera and means for automatically finding an object and focusing said camera upon said object.

My invention further relates to means for reducing the volume of the finder and focuser, so that the same will be in as compact a form as possible.

The invention consists of novel features and parts and combinations of the same, as will be fully described hereinafter and then pointed out in the claims.

Reference is to be had to the accompanying drawings, forming a part of this specification, in which similar characters of reference indicate corresponding parts in all the views.

Figure 1:
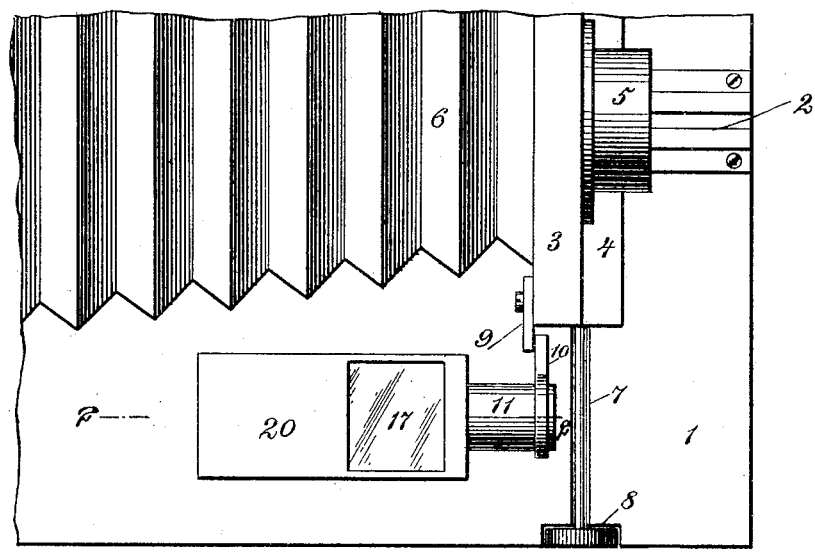
Figure 2:
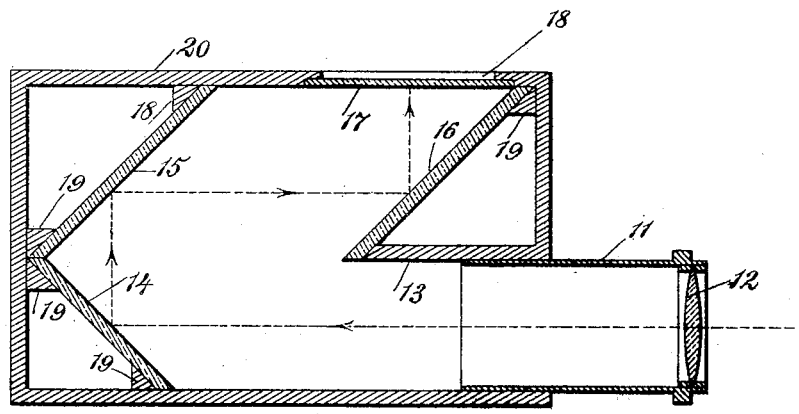

Figure 1 is a fragmentary plan showing an ordinary camera supplied with my device, and Fig. 2 is a longitudinal section of the focuser and finder along the section-line 2 2 and somewhat enlarged.

The base-plate 1 is provided with a slide 2 stationary therewith. This slide is engaged by two plates 3 and 4, connected in the usual manner. A lens-tube 5 is rigidly secured to these plates and is movable therewith by means of a thumb-screw 8, which is secured upon a revoluble shaft 7. By the revolution of the thumb-screw a bellows 6 is drawn in or out in the usual manner. Secured rigidly upon the plate 3 is an arm 9, which projects laterally to one side, and secured upon this arm is a holder 10, which moves the lens-tube 11 of the focuser in the guideway 13, so that when the lens-tube 5 of the camera is moved the lens-tube 11 of the focuser is moved simultaneously. The two lens-tubes are thus practically merged into one member. The lens 12 of the focuser is considerably smaller than the camera-lens, but has the same length of focus. If the camera-lens has a focus of eight inches, for instance, the lens 12 will also have a total focal length of eight inches. The focuser can be secured in any position parallel with the camera—for instance, as shown.

Within the casing 20 and secured thereto by angular blocks 19 are several mirrors 14, 15, and 16, which are made, preferably, of metal or of glass silvered on the side used for reflection. This is for the purpose of preventing the double images which are peculiar to the use of glass silvered on the back side. The mirrors 14 and 15 are placed, preferably, at an angle of forty-five degrees to each other, and the mirror 16 should be parallel with the mirror 15. By this means the ground-glass screen 17 beneath the opening 18 can be parallel with the base 1.

The light passing through the lens 12 falls upon the screen 14, and objects can be focused upon this screen by moving the lens-tube 11 inward or outward from the casing. The screen 17, however, is not placed directly in line with the lens nor does it face the same. It is placed at an angle to the same, as shown in Fig. 2, and the lines of light after passing through the lens are reflected by the several mirrors, so as to project the image upward upon the ground-glass screen 17. The total distance from the optical center of the lens to the center of the mirror 14, thence to the mirror 15, thence to the mirror 16, and thence to the glass screen 17 is the same as the distance required to focus the lens 12 upon an object directly. The lines of light being successively reflected at the several mirrors are, in effect, bent around so as to pursue a sinuous path for the purpose of rendering the instrument compact and also for projecting the image at a right angle to the normal direction of the light.

The operation of my device is as follows: Suppose that the operator desires to photograph a running horse the distance of which from the camera is unknown. The operator grasps the plate 3 or some connection rigid therewith and quickly slides the same inward or outward until he sees upon the screen 17 the image of the horse sharply defined, just as he would expect to see it photographed. He then snaps the camera in the usual manner. If the plate 3 be moved too far inward or outward for the proper focus to be formed in the camera, the image upon the glass screen 17 will not be sharply defined, and vice versa.

When the relative position of the parts is such that the image is sharply defined upon the screen 17, the camera is necessarily in proper focus.

It will thus be seen that while the size of the focuser and finder is much smaller than the size of the camera, yet the focal distance of the lenses is the same. The same movement would be required in each of the lens-tubes. They can be properly fastened together. The fact that the light pursues a sinuous course through the focuser and that the ground-glass screen 17 is comparatively near the lens 12 does not interfere with the above arrangement for the reason that the total length of the focal lines, even if these lines be bent, as described, is the same in both instruments.

Having thus fully described my invention, I claim as new and desire to secure by Letters Patent—

1. A combined camera and focusing-finder, comprising a camera provided with a movable lens, a box provided with an aperture, a lens-tube carrying a lens and slidably mounted within said aperture, said lens-tube being connected with said camera-lens, a series of mirrors inclined at different angles for bending the light back upon itself and projecting an image in a direction lateral to the normal direction of said light, and a screen for receiving said image.

2. A combined camera and focusing-finder, comprising a camera provided with a movable lens, a box provided with an aperture, a tube slidably mounted in said aperture and connected with said camera-lens, a lens mounted in said tube, a pair of mirrors inclined substantially at right angles to each other, for doubling the light back upon itself, another mirror parallel to one of the first-mentioned mirrors and inclined obliquely to the axis of said tube, and a screen for receiving an image.

3. A combined camera and focusing-finder, comprising a camera provided with a movable lens, a box provided with an aperture, a tube slidably mounted in the said aperture and connected with said camera-lens, a lens mounted in said tube, a pair of mirrors mounted in said box and inclined toward each other at an angle of forty-five degrees, a third mirror mounted in said box and parallel with one of said first-mentioned mirrors, but facing in a different direction to the direction in which said first-mentioned mirror faces, and a screen for receiving an image projected from the last mirror of the series.

4. A combined camera and focusing-finder, comprising a camera provided with a movable lens, a flattened box provided with an aperture at one of its ends and adjacent to one of its edges, a tube slidably mounted in said aperture and connected with said camera-lens, a lens mounted in said tube, a pair of mirrors mounted in said box adjacent to opposite edges thereof and inclined toward each other, another mirror adjacent to said tube and also adjacent to the edge of the box opposite said tube, and a screen for receiving an image; the arrangement being such that light entering through the tube is bent backward in a path parallel to its normal path, and caused to project an image.

In testimony whereof I have signed my name to this specification in the presence of two subscribing witnesses.

ULRICH NEHRING.

Witnesses:
CHARLES FREY,
HENRY HERBERT.